United States Patent Office 3,534,353
Patented Oct. 13, 1970

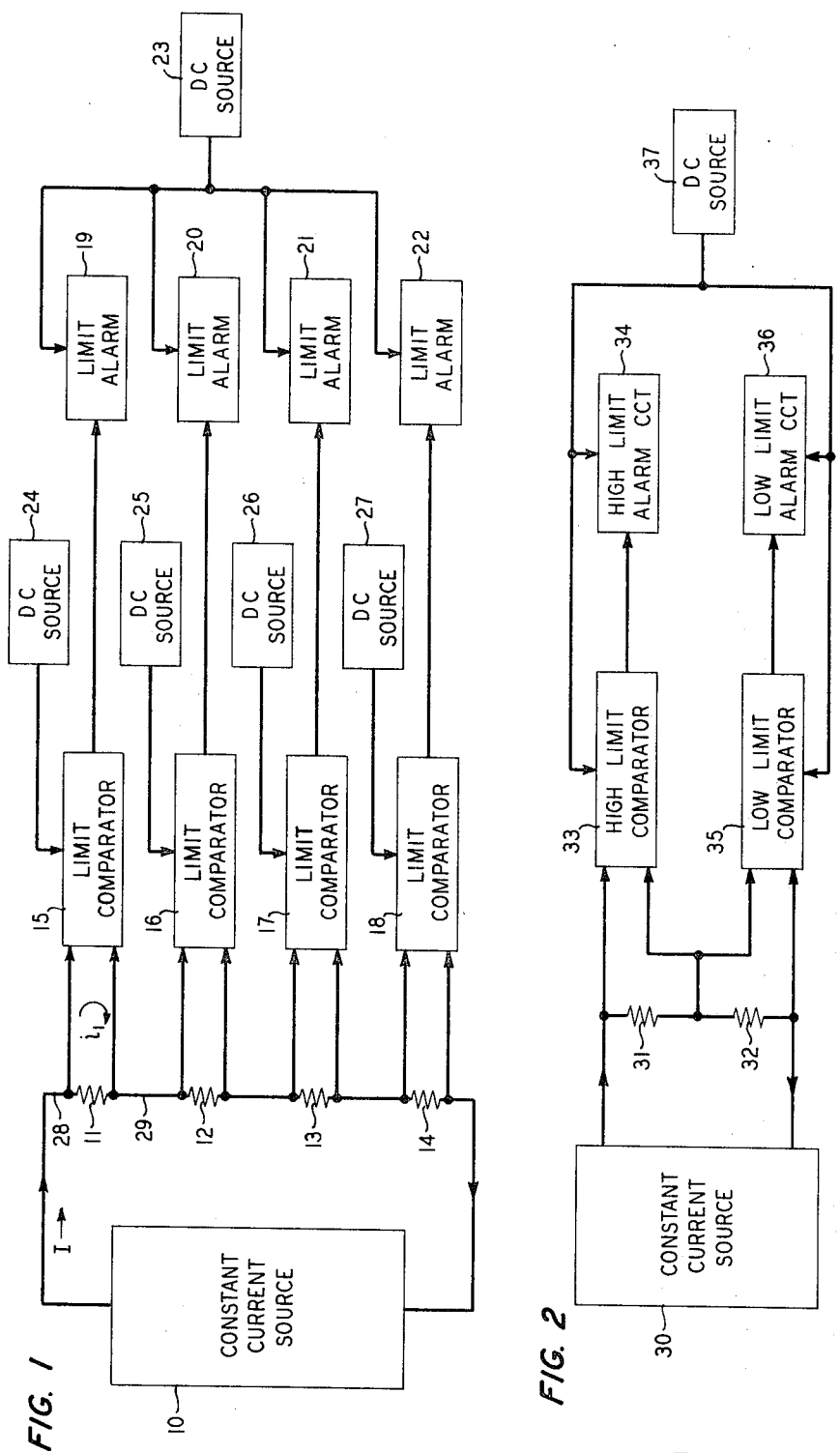

3,534,353
CURRENT LIMIT DETECTOR
Edwin T. Calkin, Parsippany, and Joseph W. Ianniello, Morristown, N.J., assignors to Bell Telephone Laboratories, Incorporated, Murray Hill, N.J., a corporation of New York
Filed July 11, 1967, Ser. No. 652,565
Int. Cl. G08b *21/00;* H03b *3/02*
U.S. Cl. 340—248
2 Claims

ABSTRACT OF THE DISCLOSURE

Predetermined current limits of a constant current source are detected by comparing the voltages across serially connected impedances with predetermined reference levels. The impedances are connected in series across the constant current source and a separate voltage comparator is connected across each one of the impedances to detect when the voltage across an impedance deviates from the respective predetermined reference level. The D.C. operating power of the individual comparators is isolated from the respective sensing currents to render the comparators effectively independent of each other, thereby providing highly accurate and stable current monitoring.

BACKGROUND OF THE INVENTION

This invention relates to current limit detectors and, more specifically, to current limit detectors which monitor the output current of constant current sources.

In applications where it has been required to accurately detect limits of current supplied from a constant current source, it has heretofore generally been necessary to use independent detectors, isolated from each other and driven by separate, independent signal current inputs in order to prevent detector interactions and consequent detection inaccuracies.

A primary object of the invention is to simplify current limit detection as applied to constant current sources.

Another object of the invention is to provide for multiple current limit detection via a single output from a constant current source.

SUMMARY OF THE INVENTION

To fulfill these objects of the invention a separate voltage comparator is connected across each one of a series of impedances which are serially connected across a constant current source. Each of the comparators detects the output current of the source by comparing the voltage developed across the respective impedance with a predetermined voltage level. In order to render the individual voltage comparators independent of each other, the individual voltage comparators have their respective D.C. operating currents isolated from the sensing current, thereby providing for highly accurate and stable current monitoring.

More specifically, in one embodiment of the invention accurate and stable current monitoring between an upper and a lower current limit is obtained by using two complementary differential amplifiers which have their D.C. paths connected in series across the D.C. source. The sensing input to the differential amplifiers is derived from a divider network which is connected in series across the current source and which has its center tap connected to the common point between the two differential amplifiers. Each of the differential amplifiers has its input connected across one leg of the divider network to compare the voltage across the respective divider leg with a predetermined reference voltage. The upper current limit detector generates an output whenever the voltage across its input rises above the predetermined upper reference level, and the lower current limit detector generates an output whenever the voltage across its input falls below the predetermined lower reference level. Alarm circuits are utilized to generate an alarm signal whenever an output is generated by either of said detectors. In addition, voltage reference elements are used to establish across each detector a fixed D.C. operating voltage which is independent of the D.C. voltages across the remaining circuits, thereby providing the isolation of the D.C. operating power from the sensing current.

BRIEF DESCRIPTION OF THE DRAWING

FIG. 1 is a block diagram of a multilimit current limit detector embodying the invention;

FIG. 2 is a block diagram of a high and low limit current limit detector embodying the invention.

DETAILED DESCRIPTION

Figure 3:
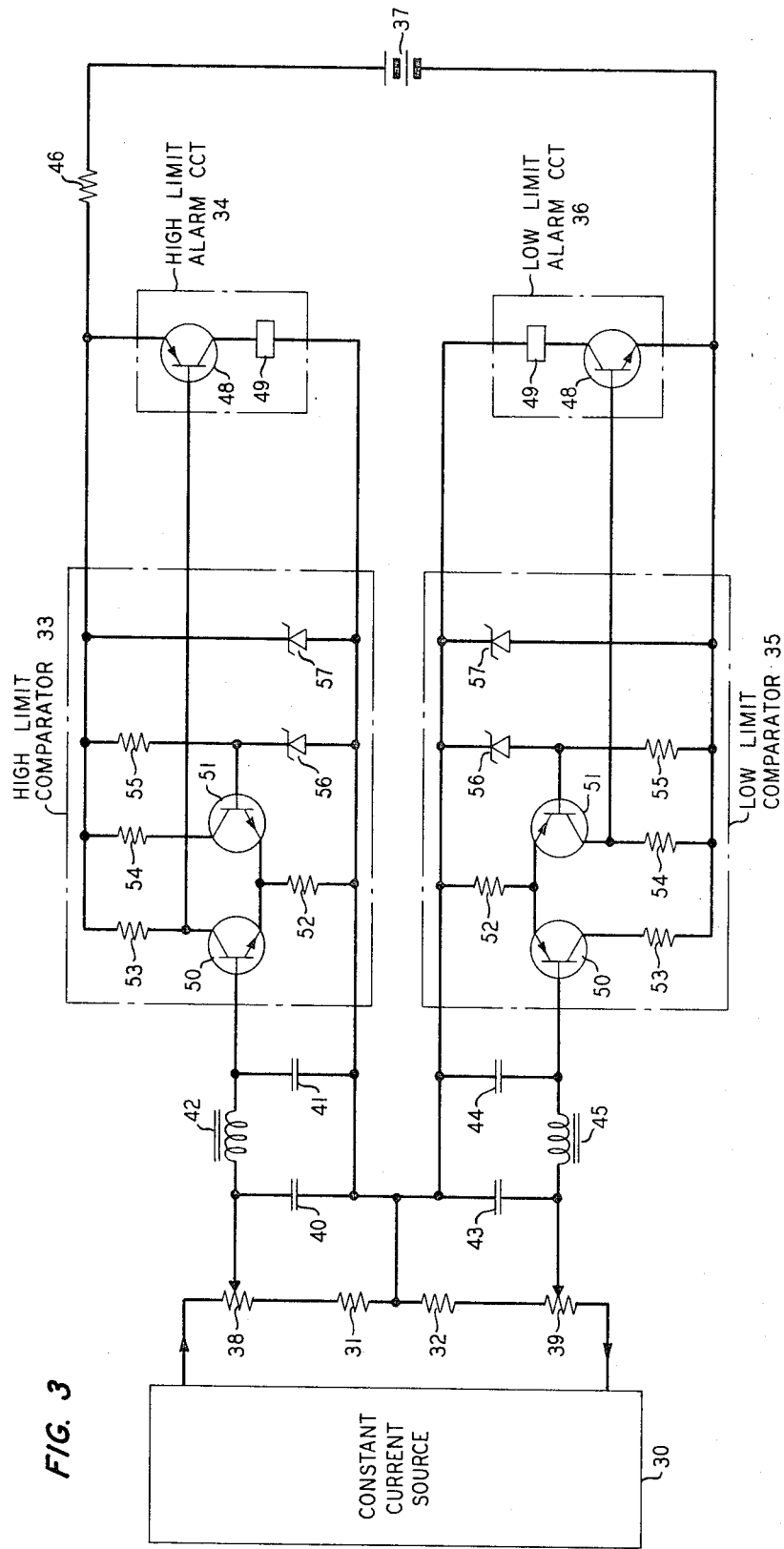
FIG. 3 is a schematic diagram of a specific embodiment of the invention which utilizes two serially connected complementary differential amplifiers as high and low current limit detectors.

The current limit detector illustrated in FIG. 1 is equipped to make four distinct current limit detections, each limit detection circuit having an associated alarm circuit to give an indication of the respective current condition. The current limit detector monitors the current which is furnished by constant current source 10. Source 10 produces an output current that is essentially constant in amplitude and therefore not a function of the external impedance connected across its terminals. A divider network comprising the serially connected resistors 11 through 14 is connected across current source 10 so that the voltage developed across each of the resistors is directly proportional to the output current of current source 10. Individual limit comparators 15 through 18 are, in turn, connected across resistors 11 through 14, respectively, to compare the voltage across the resistors with a respective associated reference level. Limit comparators 15 through 18 may be any one of a variety of voltage comparators well known in the art as described, for instance, in Section 7–15 of "Pulse, Digital, and Switching Waveforms" by Millman and Taub, McGraw-Hill Book Company, 1965, or they may be voltage comparators of the type described in conjunction with FIG. 3.

In the operation of the current limit detector of FIG. 1 each limit comparator compares the voltage across the respective resistor with a predetermined reference voltage, where the voltage across the respective resistor is a function of the amplitude of the sensing current from the current source. The reference voltage of a respective limit comparator is equal to the voltage which is developed across the corresponding resistor by a predetermined current limit, so that the comparator generates an output when the voltage across the resistor crosses the reference voltage. When, therefore, the sensing current crosses the predetermined current limit, the respective comparator generates an output which is used to activate a corresponding limit alarm. Each of the limit comparators 15 through 18 has associated with it one of limit alarms 19 through 22, respectively. Limit alarms 19 through 22 may simply comprise a relay and associated relay drive circuitry. The output of a particular relay is used to activate external utilization circuits which may indicate, for instance, whether the sensing current has crossed a particular current limit. Power for limit alarms 19 through 22 is obtained from D.C. source 23.

In order to ensure accurate and reliable limit detection each of the limit comparators 15 through 18 has its own independent D.C. source 24 through 27, respectively. As a result each limit comparator operates independently of and without being affected by the D.C. operating currents of any other limit comparator.

As a result of the isolation of the sensing current from the D.C. operating power, the overall detection accuracy of the limit detector is not degraded even though individual limit comparators have a finite input impedance. In the operation of the limit detector of FIG. 1 limit comparator 15, for instance, may have a finite input impedance and therefore draw an input current $i_1$. Of the constant current source 10 has an output current I, then the current through resistor 11 is equal to $I-i_1$ because of the current that is being drawn by limit comparator 15. Because of the isolation of the sensing current from the D.C. operating current, however, all of the sensing current $i_1$ that is withdrawn from the output current I is again returned to the output current. That is, the output current I is reduced by the input current $i_1$ at point 28, the juncture of one terminal of resistor 11 and one input terminal of comparator 15, so that the current through resistor 11 is equal to $I-i_1$. At point 29, the juncture of the other terminal of resistor 11 and resistor 12, the input current $i_1$ is again added to the current $I-i$ through resistor 11, however, so that the total current at point 29 is again equal o the total output current I. As a result, the total output current I is available for the operation of limit comparator 16. A similar current withdrawal and current return takes place for each of the other limit comparators so that each limit comparator is responsive to the entire output current I from source 10. Since it is possible to compensate for the finite input impedance of each of the limit comparators, and since each limit comparator operates independently of all other limit comparators and is not affected by the current that is drawn by any other limit comparator, the invention provides for accurate and stable current limit detection.

FIG. 2 illustrates a current limit detector which is used to monitor upper and lower current limits. The detector comprises a constant current source 30 to supply an output current to resistors 31 and 32 which are connected in series across source 30. High limit comparator 33 has its input connected across resistor 31 and its output coupled to a high limit alarm circuit 34. Low limit comparator 35, on the other hand, has its input connected across resistor 32, while coupling its output to low limit alarm circuit 36. Power for the limit detector is supplied from D.C. source 37.

The operation of the limit detector of FIG. 2 is essentially identical to the operation of the limit detector of FIG. 1, except that the limit detector of FIG. 2 is used to detect upper and lower current limits only. The respective current limits are determined by the reference levels of the high and low limit comparators. In the embodiment of the invention of FIG. 2 the limit comparators are connected in series across D.C. source 37. Each comparator includes a voltage reference element to maintain the D.C. operating voltage across the individual comparator constant and independent of the D.C. operating conditions of the other comparator.

FIG. 3 is a deailed schematic diagram of the embodiment of the invention illustrated in the block diagram of FIG. 2. Components in FIG. 3 which perform the same basic functions as the components in FIG. 2 have been given the same numerical designations. Constant current source 30 supplies a sensing current across serially connected resistors 38, 31, 32, and 39. In order to permit current limit adjustments resistors 38 and 39 have been made variable by including a movable contact on a respective resistance arm.

The input to high limit comparator 33 is connected between the junction of resistors 31 and 32 and the movable contact of resistor 38 through a filter comprising capacitors 40 and 41 and inductor 42. The input to low limit comparator 35, on the other hand, is connected between the junction of resistors 31 and 32 and the movable contact of resistor 39 through a filter comprising capacitors 43 and 44 and inductor 45. The outputs of limit comparators 33 and 35 are coupled to limit alarm circuits 34 and 36, respectively. Each alarm circuit in turn comprises a transistor 48 and relay 49, where transistor 48 of high limit comparator 33 is a p-n-p transistor, while transistor 48 of low limit alarm circuit 36 is an n-p-n transistor. The D.C. power for the limit detector is supplied from source 37 through resistor 46.

Limit comparators 33 and 35 each comprise transistors 50 and 51, resistors 52 through 55, and reference diodes 56 and 57. The limit comparators are complementary differential amplifiers; that is, they are identical except that transistors 50 and 51 in high limit comparator 33 are n-p-n transistors, while transistors 50 and 51 in low limit comparator 35 are p-n-p transistors. Transistors 50 and 51 have their emitter electrodes connected together and to one terminal of resistor 52. The collector electrodes of transistors 50 and 51, on the other hand, are individually connected to one terminal of resistors 53 and 54, respectively. The base electrode of transistor 51 is connected to the junction of resistor 55 and reference diode 56. The other terminal of resistor 52, reference diode 56, and one terminal of reference diode 57 are connected to the junction of resistors 31 and 32 as one input point of the comparator, thereby establishing a common point between high limit comparator 33 and low limit comparator 35. The base electrode of transistor 50 is used as the other input point and is connected through the respective input filter to the movable contact of the respective variable resistor of the divider network, thereby completing the input circuit. The other terminals of resistors 53, 54, 55, and of reference diode 57 are connected together to provide for a power input terminal which is directly connected to the negative terminal of D.C. source 37 for low limit comparator 35 and connected through resistor 46 to the positive terminal of power source 37 for high limit comparator 33. The power path for the two comparators is completed through their common input point at the junction of resistors 31 and 32. As a result, reference diodes 57 of comparators 33 and 35 are connected in series across source 37 and resistor 46, thereby establishing a fixed D.C. voltage across the individual comparators.

Alarm circuits 34 and 36 have the collector electrode of transistor 48 connected to one terminal of relay 49 and are coupled to a respective comparator by connecting the other terminal of relay 49 to the common point between the limit comparators. The emitter electrode of transistor 48, on the other hand, is connected to the junction point of resistors 53, 54, 55, and reference diode 57. The base electrode of transistor 48 is used to receive the energization signal from the respective limit comparator; that is, high limit alarm circuit 34 receives its input from the collector electrode of transistor 50 of high limit comparator 33, while the low limit alarm circuit 36 receives its input from the collector electrode of transistor 51 of low limit comparator 35.

In the operation of the embodiment of the invention of FIG. 3, constant current source 30 applies the output current I which is to be monitored by the limit detector to the serially connected resistors 38, 31, 32, and 39. The circuit of FIG. 3 provides two current limit detections; that is, a high current limit detection by high limit comparator 33 together with high limit alarm circuit 34, and a low limit current detection by low limit comparator 35 in conjunction with low limit alarm circuit 36. High limit comparator 33 monitors the output current of constant current source 30 by monitoring the voltage across resistors 38 and 31, where variable resistor 38 is used to vary the input voltage to the comparator, thereby varying the current limit which causes the high limit comparator to be activated.

The voltage developed across resistors 38 and 31 is applied to the input of high limit comparator 33 through the filter network comprising capacitors 40 and 41 and inductor 42. The filter arrangement functions to reduce the sensitivity of the comparator by filtering the input, thereby preventing sporadic noise bursts from activating the comparator. Limit comparator 33 is a conventional differential amplifier. A fixed, independent D.C. operating voltage is established for comparator 33 by reference diode 57. Reference diode 56, on the other hand, establishes the reference voltage which is compared to the input voltage applied between the common point of the differential amplifier and the base electrode of transistor 50. When the output current I of constant current source 30 is below the predetermined upper current limit, the input voltage is lower than the reference voltage so that transistor 51 conducts and transistor 50 is cut off. As a result high limit comparator 33 does not generate an output. When the output current I exceeds the upper current limit, however, the input voltage exceeds the reference voltage at the base of transistor 51. Consequently, transistor 50 becomes forward biased into conduction, thereby generating an output at its collector electrode. This output of high limit comparator 33, in turn, is coupled to high limit alarm circuit 34, thereby forward biasing transistor 48. As a result relay 49 becomes energized to perform the high limit alarm operations through the activation of its contacts. When the output current of the constant current source 30 again drops below the high current limit, however, the forward bias on transistor 50 is removed to de-energize high limit alarm circuit 34.

Low limit comparator 35 operates in a fashion similar to the operation of high limit comparator 33, except that the input to comparator 35 is derived from the voltage developed across resistors 32 and 39 and its output is taken from the collector electrode of transistor 51.

In the operation of low limit comparator 35 the voltage developed across resistors 32 and 39 is compared to the reference voltage of reference diode 56. Variable resistor 39 is used to control the low current limit which activates comparator 35. As long as the output current of constant current source 30 is greater than the low current limit, transistor 50 is forward biased by the input voltage to low limit comparator 35 and transistor 51 is turned off. As a result, low limit comparator 35 does not generate an output. As soon as the output current of source 30 decreases below the lower current limit, however, transistor 50 is turned off and transistor 51 becomes turned on, thereby generating an output to activate low limit alarm circuit 36. When the output current of constant current source 30 again increases above the lower current limit, however, transistor 51 is again turned off to remove the output from low limit comparator 35, thereby de-activating low limit alarm circuit 36.

The primary advantage of the limit detector illustrated in FIG. 3 is the accuracy and reliability which is principally attributable to the isolation of the input sensing current from the D.C. operating power of the individual comparators. This separation of the input sensing current from the D.C. operating power allows the use of simple, low input impedance comparators without degrading the accuracy of the limit detection.

In the operation of the limit detector of FIG. 3, constant current source 30 may, for instance, furnish an output current I and limit comparators 33 and 35 may draw input currents $i_1$ and $i_2$, respectively. Since each limit comparator has its own independent D.C. voltage established by the respective reference diode, the respective input currents $i_1$ and $i_2$ are returned to the constant current source output current I. That is, high limit comparator 33 draws its input current $i_1$ from the movable contact of resistor 38, routes it through the base-emitter circuit of transistor 50 and then returns the current $i_1$ to the junction of resistors 31 and 32 to restore the total output current I. Similarly, low limit comparator 35 draws its input current $i_2$ from the junction of resistors 31 and 32, routes it through the base-emitter circuit of transistor 50 and returns the current to the movable contact of resistor 39 to again restore the total output current I. The respective variable resistances may be adjusted to compensate for the particular input current to the respective limit comparator so that each limit comparator effectively sees at its input the total output current I of the constant current source, independent of the input currents to the individual comparators.

By isolating the input current from the D.C. power supply and by routing the input current for a respective differential amplifier from the divider network through the input circuit of the particular differential amplifier and then back into the divider at the common point, the effects of one differential amplifier on its input current are not transferred to affect the input current of the other differential amplifier. As a result, each one of the two serially connected differential amplifiers performs its current amplitude sensing independently and without any adverse interaction from and on the other differential amplifier.

What is claimed is:

1. A direct current limit detector for determining when a current from an input source falls outside of predetermined limits comprising first and second impedance elements connected in series with one another across said input source, said input source having an internal impedance many times larger than the impedance of said first and second impedance elements whereby the current output of said input source is substantially a constant value, first and second voltage comparators connected in series and having their input terminals connected across said first and second impedance elements, respectively, said first and second comparators each having one of its input terminals connected to the juncture of said first and second impedance elements, said first voltage comparator biased by a first reference voltage to respond to an upper threshold voltage and comprising a transistor differential amplifier in which the transistors are of one conductivity type, said second voltage comparator biased by a second reference voltage to respond to a lower threshold voltage and comprising a transistor differential amplifier in which the transistors are of a conductivity type opposite to the conductivity type of the transistors in said first voltage comparator, an energizing source of DC voltage connected in a closed loop with said first and second voltage comparators, the collector-emitter paths of the transistors of said first and second voltage comparator being connected in series with each other and in series with said energizing source of D.C. voltage, first and second Zener diodes connected in parallel with the differential amplifiers of said first and second voltage comparators, respectively, and oriented to generate their reverse breakdown voltage in response to said energizing source of D.C. voltage, said first and second Zener diodes establishing a fixed independent operating voltage for the differential amplifiers of said first and second voltage comparators, respectively, whereby said first voltage comparator generates an output when the voltage across said first impedance element activates said first voltage comparator as its input rises above said upper threshold voltage and said second voltage comparator generates an output when the voltage across said second impedance element coupled to the input of said second voltage comparator falls below said lower threshold voltage and means to generate an alarm signal whenever an output is generated by either of said first or second comparators.

2. A direct current limit detector in accordance with claim 1 in which each of the differential amplifiers of said voltage comparators comprises a pair of transistors having their emitters connected to a common juncture wherein the collector-emitter path of the transistor of said first voltage comparators are connected in series with the collector-emitter path of the transistors of said second voltage comparator via said juncture of said first and second impedance elements, and third and fourth reference Zener diodes connected to the base of one of the transistors of the differential amplifier of said first and second voltage comparators, respectively, to supply said first and second reference voltages determining said first and second threshold voltages to which said first and second voltage comparators respond, respectively.

References Cited

UNITED STATES PATENTS

| | | | |
|---|---|---|---|
| 2,787,732 | 4/1957 | Kusko | 323—7 |
| 3,204,193 | 8/1965 | Rhyne | 328—148 |
| 3,246,233 | 4/1966 | Herz | 323—9 |
| 3,336,511 | 8/1967 | Wajs | 340—248 |
| 3,351,847 | 11/1967 | Jansson et al. | 340—248 |
| 3,178,698 | 4/1965 | Graham | 340—248 |
| 3,304,490 | 2/1967 | Dubin et al. | 340—248 |
| 3,127,589 | 3/1964 | Harris | 340—248 |
| 3,310,688 | 3/1967 | Ditkofsky | 328—150 |
| 3,334,241 | 8/1967 | Ussery. | |
| 3,351,927 | 11/1967 | Stinson | 340—248 |
| 3,431,557 | 3/1969 | Thomas et al. | 340—248 |

OTHER REFERENCES

Bob Russell, senior project engineer Transducer Dept. Electro-Optical Systems Inc., Pasadena, Calif.—Journal Electronic Design, Apr. 26, 1965, vol. 13, No. 9, pp. 44–45.

Electronics, Sept. 23, 1960—Voltage Regulators—Earl Wilson, pp. 62–65.

ALVIN H. WARING, Primary Examiner

D. MYER, Assistant Examiner

U.S. Cl. X.R.

328—148